United States Patent
Park et al.

(10) Patent No.: US 10,846,284 B1
(45) Date of Patent: Nov. 24, 2020

(54) VIEW-BASED DATA MART MANAGEMENT SYSTEM

(71) Applicant: Amazon Technologies, Inc., Seattle, WA (US)

(72) Inventors: Yangbae Park, Seattle, WA (US); Aaron John Seldon Steers, Seattle, WA (US); Jason Scott Flittner, Seattle, WA (US); Stuart William Barnes, Reading (GB); Siddharth Sridhar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 529 days.

(21) Appl. No.: 14/673,623

(22) Filed: Mar. 30, 2015

(51) Int. Cl.
*G06F 7/00* (2006.01)
*G06F 16/23* (2019.01)
*G06F 16/25* (2019.01)
*G06F 16/28* (2019.01)

(52) U.S. Cl.
CPC ........ *G06F 16/2393* (2019.01); *G06F 16/254* (2019.01); *G06F 16/283* (2019.01)

(58) Field of Classification Search
CPC ........ G06F 17/30309; G06F 17/30292; G06F 17/30345; G06F 16/254; G06F 16/2393; G06F 16/283
USPC ................ 707/600, 601, 602, 705, 759, 798
See application file for complete search history.

(56) References Cited

U.S. PATENT DOCUMENTS

| | | | |
|---|---|---|---|
| 6,718,320 B1 * | 4/2004 | Subramanian .... | G06F 16/24542 707/719 |
| 7,844,639 B2 * | 11/2010 | Cohen ............... | G06F 17/30297 707/803 |
| 2005/0050076 A1 * | 3/2005 | Tong ................. | G06F 17/30297 |
| 2006/0294159 A1 * | 12/2006 | Dettinger ............... | G06F 16/88 |
| 2008/0162512 A1 * | 7/2008 | Mall ..................... | G06F 16/284 |
| 2015/0081741 A1 * | 3/2015 | Xu ..................... | G06F 17/30289 707/798 |

OTHER PUBLICATIONS

Amazon Web Services, Inc., Amazon Redshift Database Developer Guide, "Use Time-Series Tables."; https://web.archive.org/web/20150313081607/https://docs.aws.amazon.com/redshift/latest/dg/c_best-practices-time-series-tables.html; (2015), p. 33, accessed on Jan. 21, 2020.

* cited by examiner

*Primary Examiner* — Md I Uddin
(74) *Attorney, Agent, or Firm* — Davis Wright Tremaine LLP (57) ABSTRACT

A data analysis platform may be based on database views. A build module may receive, from a source code repository, information about a modified definition of a view. The build module may identify schema objects on which the view depends and form instructions for creating the view and the schema objects. The instructions may be executed to form the updated version of the view in a schema space separate from a production schema space. A deployment pipeline may coordinate replacing the production version of the view with the new version in response to validating the new version of the view.

20 Claims, 9 Drawing Sheets

VIEW-BASED DATA MART MANAGEMENT SYSTEM

BACKGROUND

Online analytical processing ("OLAP") may involve viewing data that has been transformed in various ways. Typical transformations involve operations such as rolling-up, drilling-down, and pivoting on various dimensions of the data. One way of performing these types of transformations involves the use of database views. Typically, a database view is associated with instructions for transforming the data and presenting it in a format suitable for performing analytics. Database views may be materialized ahead of time, which may help to reduce the time needed to respond to a client's request to view the transformed data.

There are, however, a number of difficulties involved in using database views in conjunction with OLAP applications. While materialized views can help shorten response times, they may require frequent updating as new data is added to the system and the views become out-of-date. Another difficulty is that OLAP applications may use large numbers of views. Views may be provided to support analysis based on various drill-down levels, dimensions, and so forth. The number of views that results from such an approach may views unwieldy for use with many OLAP applications.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

A data analysis platform based on database views may involve maintenance procedures possessing characteristics that promote convenient creation and recreation of views. The use of views to perform data analysis functions is known, but typically involves a significant amount of supervision and intervention by a database administrator. Various aspects of the present disclosure involve a data analysis platform that uses view-based data analysis while minimizing the supervision and intervention typically required by conventional approaches. View-based data analysis, as applied using various aspects of the present disclosure, may involve more extensive use of views to enable data analysis than would typically be practical. A number of views, corresponding to various approaches to data analysis, may be defined and in some cases materialized prior to use in analysis, in order to improve the responsiveness of the data analysis platform. The views may present data that has been transformed through operations such as aggregation or summarization to further an analysis function. For example, one view might represent a summary of sales figures on a per-quarter basis, while another might present the same sales figures on a weekly basis, thereby enabling "drill-down" analysis. Still another view might pivot on some dimension, such as weekly sales per product type.

In one example embodiment, a data analysis platform may comprise a number of storage nodes, each of which operates a database management system that maintains views used for data analysis. A storage node may comprise a computing node operating a database management system that works in conjunction with other storage nodes to maintain a set of data that is larger than a single database management system could effectively handle. A storage node may manage a subset of the data maintained by the set of storage nodes. Storage nodes may sometimes be referred to as shards or partitions.

A view may include various structures and procedures for accessing data obtained from a source table. The data may be the result of a query. In some instances, views may comprise the structured query language ("SQL") element known as a view. However, as used herein, the term view is not limited to this aspect. A view might, for example, be materialized as a table. The data for a view is, typically, obtained by executing a query against a source table. In some instances, various transformations, calculations, projections, and so forth may be performed on the data obtained from the source table. Similarly, as used herein, the term source table can include conventional tables as well as various other structured, semi-structured, or unstructured sources of data.

The views used in the platform may be stored in a source code repository. When ready for deployment to the data analysis platform, a build module may receive an updated definition of a view already maintained in the database management system. Deploying the view may involve replacing the existing view with a new version of the view that is based on the updated definition. Rather than updating the view in-place, for example by modifying the existing view, embodiments may create a new version of the view, validate it, and then cause the new version of the view to be used in place of the old version. A source code repository may comprise a computing node that maintains various source code files, such as files containing view definitions. Typically, a developer of a view definition or other source code file may submit new or modified versions of a source code file to the source code repository, which then stores the file. Other clients of the repository may be notified, through various mechanisms, that new or modified file is available. Source code repositories may also provide versioning capabilities, which may involve associating groups of files with an identifier such as a version number. The source code repository may permit the associated files to be accessed as a group, so that all files corresponding to a particular version might be accessed together.

Validation of a view may involve determining that the view was successfully created. An embodiment might, for example, process return codes resulting from execution of a data definition language ("DDL") statement. A workflow engine or build module might also coordinate additional validation operations. In some cases, a workflow engine might coordinate the execution of various test processes that may determine that a view is functioning as expected. Validation operations may also be performed on sets of views and other related schema objects.

In various instances, the view may depend on other objects maintained in the database management system. These may be referred to as schema objects, which can include other views, stored procedures, user-defined functions, fact tables, dimension tables, and so forth. The build module may, when examining the new definition of the view, determine that the new version of the view is dependent on one or more schema objects. Embodiments may also cause these schema objects, on which the new version of the view depends, to be created or recreated, rather than relying on or modifying an existing version of the schema object. A set of schema objects, which may be referred to as managed schema objects, may be those schema objects that are created and recreated, as described herein, based on various source tables or other unmanaged schema objects.

A build module may form a set of instructions for creating the new version of the view as well as any schema objects on which the view depends. The ordering of the instructions may be based on dependencies between the new version of the view and any schema objects on which the view depends. The set of instructions may consist of various subsets, such as those to be executed by the database management system and those to be executed by other components, such as a workflow engine.

In some embodiments, a pipeline technique may be used to build and deploy the new version of the view and the schema objects on which it depends. A workflow engine may coordinate various stages of the pipeline. These stages may include obtaining a set of instructions for creating the view from the build module, causing the instructions to be executed and thereby creating the view, causing the new version of the view to be tested and validated, and replacing the old version of the view with the new version.

Figure 1:
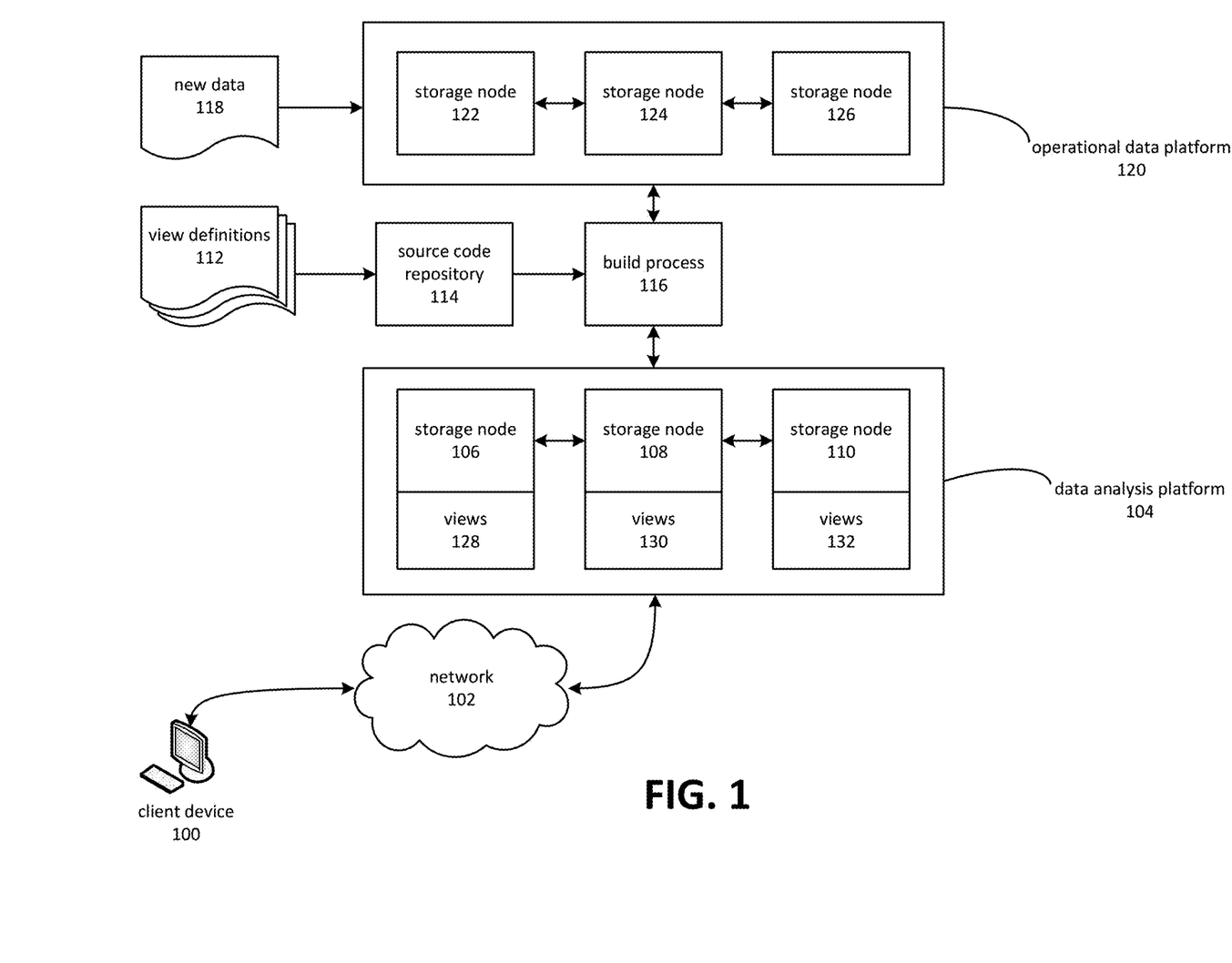
FIG. 1 is a block diagram depicting a view-based data analysis platform.

FIG. 1 is a block diagram depicting a view-based data analysis platform. A client device 100 may communicate via network 102 to a data analysis platform 104. Data analysis platform 104 may, in some instances, be a service hosted at a facility remote to client device 100. Network 102 may, in such instances, be the Internet.

A data analysis platform 104 may comprise a number of storage nodes 106, 108 and 110. A storage node may comprise a computing node, or a cluster of computing nodes, and a database management subsystem for maintaining, storing, and performing queries on data stored on one or more storage devices associated with the computing node. A database management subsystem may, in some instances, be a standalone database management system that acts as a shard of data analysis platform 104.

Storage nodes 106, 108, and 110 may each maintain a subset of the data maintained by data analysis platform 104, including various schema objects such as views, stored procedures, data types, fact tables, dimension tables, and so forth. An aspect of the present disclosure involves a greater reliance on views than may typically be used in conventional online analytical processing ("OLAP") applications. As such, client device 100 may typically issue queries against various views maintained on storage nodes 106, 108, and 110.

Another aspect of the present disclosure involves systems and methods for facilitating maintenance of views. View maintenance has, typically, been a barrier to the use of views in data analysis applications. In the example of FIG. 1, a build process 116 automates various aspects of view maintenance. The build process 116 may receive, from source code repository 114, information that indicates that one or more of view definitions 112 have been modified. In response, build process 116 may initiate a rebuild, which may also be described as a recreation, of the views and other schema objects maintained on the storage nodes 106, 108, and 110 of data analysis platform 104.

The data on which the views of the data analysis platform 104 are based may originate from an operational data platform 120. The operational data platform 120 may house various types of operational data, such as data that might be generated by the operation of an e-commerce system, a point-of-sale system, and so forth. These examples of operational data are intended only to be illustrative, and should not be viewed as limiting the scope of the present disclosure. More generally, operational data platform 120 may house "raw data" that is not in a form that is convenient for performing analytical operations. The data maintained by operational data platform 120 may be maintained on one or more storage nodes 122, 124, and 126.

Build process 116 may, while rebuilding the views maintained in data analysis platform 104, transfer data from operational data platform 120 to data analysis platform 104. The views of the data analysis platform 104 may therefore be based on or otherwise incorporate the data from the operational data platform 120.

New data 118 may be added on a continuous, periodic, or intermittent basis to operational data platform 120. The addition of new data 118 may cause the views of data analysis platform 104 to fall out-of-date. Although a typical approach might be to update the affected views, an aspect of the present disclosure may involve recreating the affected views. In some instances, embodiments may recreate a substantial portion or even all of the views of data analysis platform 104, as well as any schema objects on which the views depend. Some embodiments may periodically recreate and possibly rematerialize views in a database management system, where the period is based at least in part on the frequency at which data is being added. Embodiments may recreate views after determining that a threshold amount of time has elapsed. The threshold amount may be based in part on the frequency at which data is added to the database management system and the degree to which up-to-date data is considered useful. For example, views corresponding to daily summaries might be created or recreated daily, while weekly summaries might be created or recreated weekly.

When recreating views, embodiments may identify the latest version of each view definition, as well as the latest versions of any other schema objects on which the views depend. The latest versions of these definitions may be retrieved from the source code repository and used to recreate the views.

Rematerialization of a view may involve both recreating the view in the database management system and causing the recreated view to be materialized. In materialization, the data corresponding to the view is retrieved and/or calculated, and stored in the database management system so that it is available when the view is subsequently queries. For example, a view might comprise a column that contains a sum of sales figures. These sums might be pre-computed and stored during the materialization process. Later, when a query that references the view is executed, the stored values for the sums can be retrieved, thus avoiding the need to compute them while the query is being processed.

Figure 2:
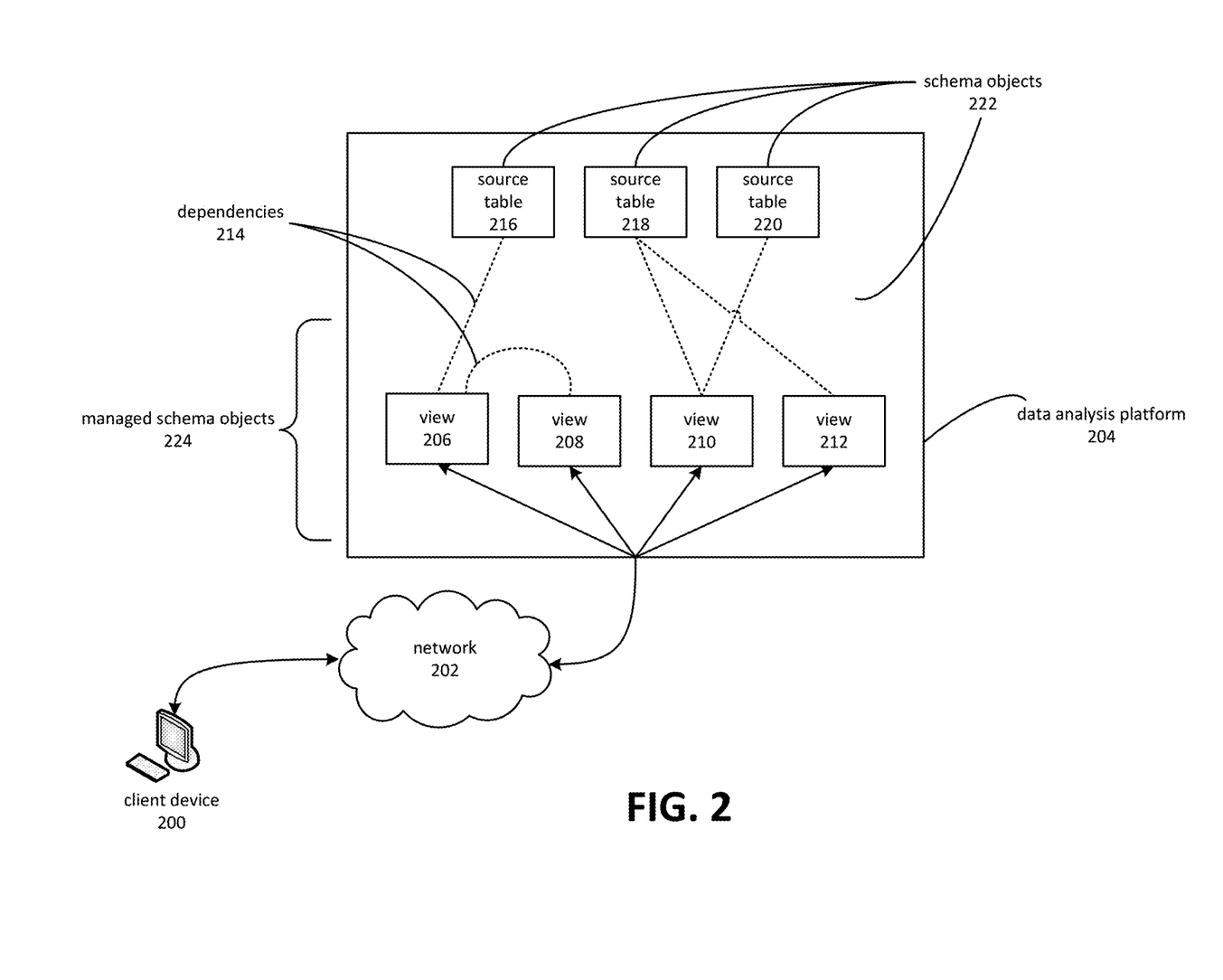
FIG. 2 is a block diagram depicting client-device interaction with a data analysis platform.

In various instances, client device interaction with a data analysis platform may be directed primarily to views, rather than other schema objects maintained on the platform. FIG. 2 is a block diagram depicting client-device interaction with a data analysis platform 204. A client device 200 may transmit queries over network 202 to data analysis platform 204. The queries may be directed primarily to one of the various views 206, 208, 210, and 212 maintained on the data analysis platform 204. The views 206-212 may be formed so as to facilitate various forms of analysis and insight generation. For example, the views might be constructed to aggregate or summarize data in various dimensions, to provide rolled-up or drilled-down perspectives on data, or to represent various forms of pivoted data. The views 206-212 may be materialized or non-materialized. In various instances, the views 206-212 may be dependent on various schema objects 222, such as source tables 216, 218, and 220. A source table, such as source table 216, may be maintained on a computing node external to data analysis platform 204, for example, in a transaction processing system, or maintained by data analysis platform 204.

Interaction between client device 200 and data analysis platform 204 may be based on the set of managed schema objects 224. In some cases and embodiments, the queries performed by data analysis platform 204 on behalf of client device 200 may be limited to the set of managed schema objects 224. The managed schema objects 224 may comprise views, tables, custom procedures, scripts, user-defined data types, and so on. In some embodiments, each of the managed schema objects 224 may be recreated. Embodiments may, for example, identify a set of managed schema objects 224, identify any dependencies between various managed schema objects 224, such as between view 206 and view 208, determine an order in which the managed schema objects 224 should be recreated based on the identified dependencies, and formulate instructions (such as data definition language statements) that may be executed to form the managed schema objects 224. Various dependencies 214 may exist between source tables 216-220 and views 206-212. There may also be dependencies between the various managed schema objects 224, such as between view 206 and view 208. Embodiments may form a dependency graph based on computerized analysis of view definitions. In some instances, a dependency module, build module, and/or workflow engine may coordinate execution of the instructions for forming the managed schema objects 224. This may comprise monitoring creation of schema objects, delaying creation of objects whose dependencies are not present, scheduling creations so that longer-running tasks are scheduled first, and ordering execution of the various instructions for creating schema objects.

Figure 3:
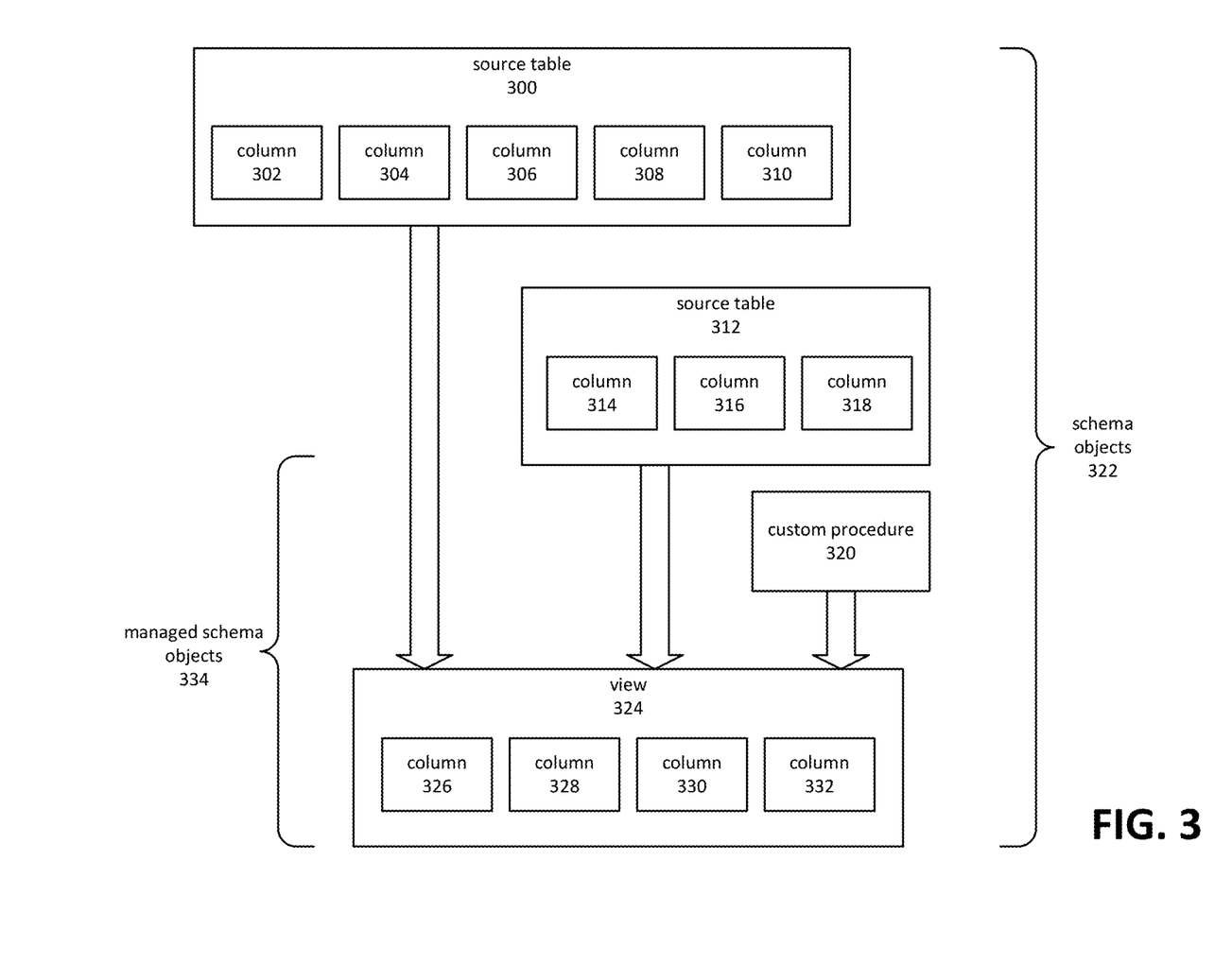
FIG. 3 is a block diagram depicting dependencies between views and other types of schema objects.

FIG. 3 is a block diagram depicting dependencies between views and other types of schema objects. A view 324 may comprise columns 326, 328, 330, and 332. A column, such as columns 326, 328, 330, or 332, may comprise a collection of values sharing a common structure and often sharing a common meaning. In view 324, the columns 326-332 may be based on various other schema objects 322. The various schema objects 322 can include various structures and data maintained by a database management system. These schema objects may include, for example, source table 300, source table 312, or a custom procedure 320. These examples are intended to be illustrative of different types of schema objects. The views 326-332 may be based on various other types of schema objects, in addition to those depicted in FIG. 3. A view may be dependent on a schema object in a variety of ways. In some instances, data in the view's columns 326-332 might be derived from the columns 314, 316, and 318 in source table 312. In other instances, a custom procedure 320 might be used by a query invoked to materialize a view 324. In another instance, data in the columns 326-332 or the view 324 might be derived from the the columns 302-310 of a source table 300.

Figure 4:
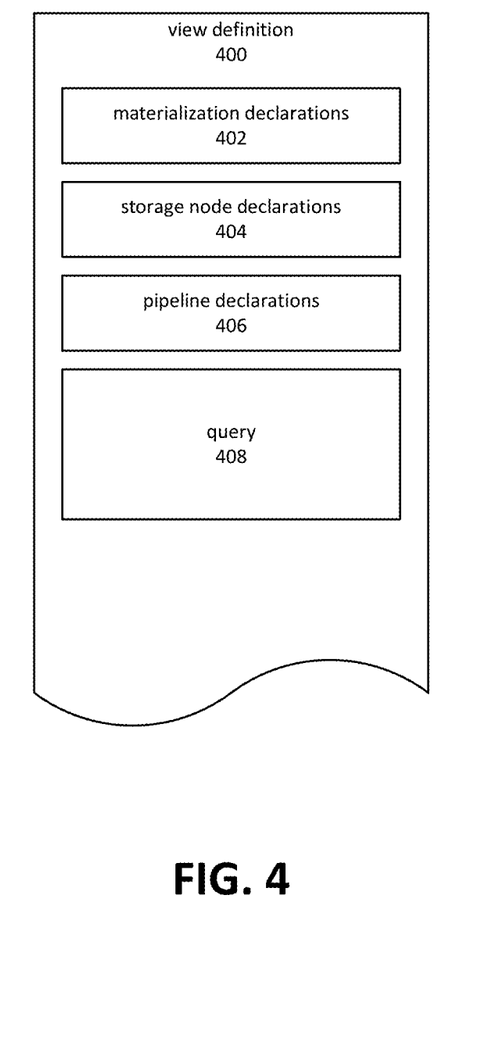
FIG. 4 is a block diagram depicting a view definition file.

Aspects of the present disclosure may involve view definition data used to specify views to be created in a data analysis platform. FIG. 4 is a block diagram depicting a view definition 400. The view definition 400 may contain a variety of information indicative of a view to be created on a data analysis platform. This may include information indicative of a query 408 that specifies the contents of the view. The view definition 400 may be contained in a file or set of files, a message, and so forth.

A materialization declarations 402 section of view definition 400 may indicate various aspects of materializing the view, including specifying whether or not the view should be materialized. A non-materialized view may be seen as similar to a stored query in which the results of the query are determined on an as-needed basis. A materialized view, on the other hand, may be pre-processed so that the view's data is formed and stored during materialization. The contents of a view, whether materialized or non-materialized, are typically specified by a query that may be executed against one or more sources of data, such as database tables or other views.

A storage node declarations 404 section of view definition 400 may supply information regarding the storage node(s) on which the view might be located. For example, referring back to FIG. 1, a view might be located on any or all of partitions 106, 108, or 110. The partition declarations 404 section may be used to influence which storage nodes are selected.

Figure 6:
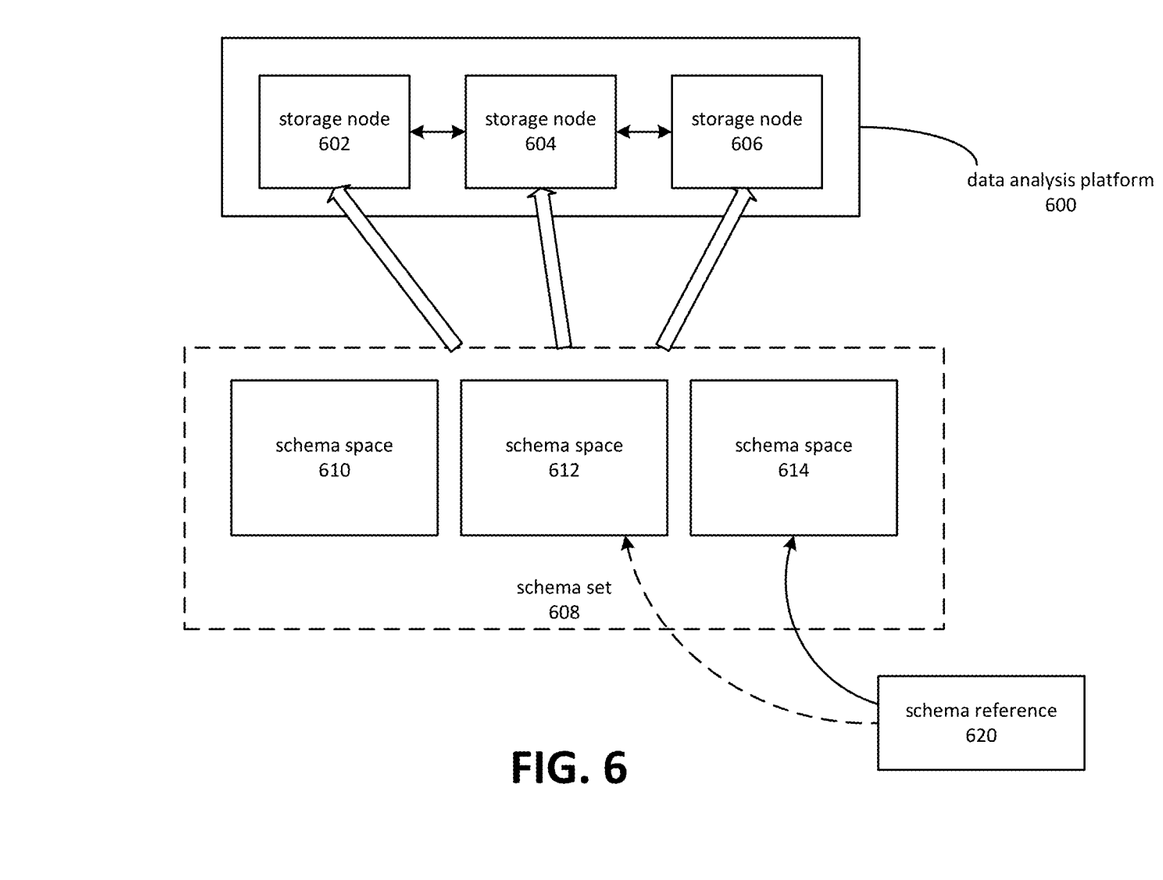
FIG. 6 is a block diagram depicting schema spaces applied to a data analysis platform comprising multiple storage nodes.

A pipeline declarations 406 section of view definition 400 may contain information indicative of how the creation of the view is to be handled with respect to a development pipeline, discussed herein at least in connection with FIG. 6. The pipeline declarations 406 may supply information such as what validation steps are to be performed on the view, what schema space the view might initially be deployed to, and so forth.

Embodiments may utilize the view definition to apply various transformations and optimizations on the data, including those transformations and optimizations that may improve performance in OLAP, data mining, and other data analysis scenarios. For example, view definitions may include information pertaining to column-wise compression, data type conversions, and so forth. In the case of column-wise compression, the view definition may specify that the column is to be compressed on a column-wise basis, and may further provide information, such as a symbol table, which may be used to perform the compression. In the case of data type conversion, the view definition may include or refer to transformations on the data that can be used to convert data from the source data to a type more suitable for data analysis. For example, the view definition might specify that a text field containing a number is to be converted to a numeric data type in the corresponding view.

The format for a view definition that is depicted by FIG. 4 is intended to be illustrative of various concepts and techniques applicable to the present disclosure. In various instances, the sections depicted as being included in the view definition 400 may be altered or omitted. Additional sections may also be included.

View definitions may be edited or created by a developer or in some cases by a development tool, and stored in a source code repository. View definitions that have changed may, in various embodiments, be processed by a pipeline to build, validate, and deploy the modified view. In some instances, view definitions and potentially other resources stored in a source code repository may be associated with each other. A set of related definitions might, for example, be associated with a particular version number. The set of related definitions might then be processed by the pipeline as a group.

Figure 5:
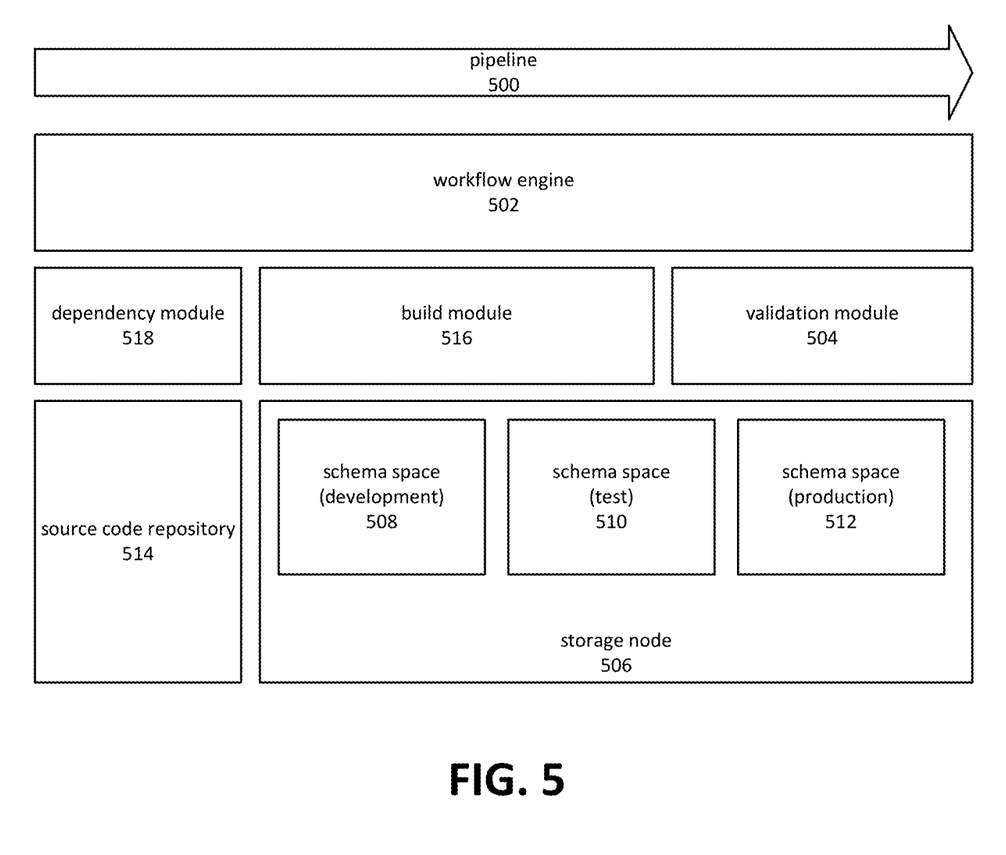
FIG. 5 is a block diagram depicting a view deployment pipeline.

FIG. 5 is a block diagram depicting a view deployment pipeline. A pipeline 500 may comprise various components and processes related to the automated deployment of one or more view definitions to a data analysis platform. The components and processes generally act to perform operations such as retrieving updated view definitions from a source code repository 514, building the views and any dependencies thereof, deploying the views, validating the deployment, and cause the deployed views to be used.

A build process 516 may receive information from a source code repository 514 that one or more view definitions, and possibly other related files, have changed. The related files may be identified by a version number of other identifier.

In some embodiments, a workflow engine 502 may coordinate pipeline operations, such as those performed by dependency module 518, build module 516, and validation module 504. The workflow engine 502 may comprise a software library or executable process. The build module 516 may also comprise a software library or executable process, and may be combined with the workflow engine 502 and/or the validation module 504 as an integrated unit.

A dependency module 518 may identify dependencies expressed or inherent in view definitions. Based on the identified dependencies, the dependency module 518 may determine an order in which the set of managed schema objects may be created or recreated. The order may be based on build dependencies, operational dependencies, the time required to build the object, and so on. The dependency module 518 may communicate information pertaining to the dependencies to workflow engine 502, build module 516, and/or validation module 504. Embodiments may use the communicated information to cause the various managed schema objects to be built in the determined order. This may include monitoring the creation of certain objects (for example, those schema objects on which other schema objects depend) to pause or continue creation of the various managed schema objects.

The build module 516 may form a set of instructions that, when executed, cause the view definitions to be created on the data analysis platform. The instructions may comprise ordering instructions that are based on dependencies of the views. For example, the build module 516 may determine that a view is dependent on another schema object, and form instructions that, when executed, cause the schema object to be created on the data analysis platform, followed by the view. In some instances, build module 516 may also generate instructions for forming the view on the data analysis platform. This may comprise, for example, generating data definition language instructions based on declarative statements, in the view definition, that are indicative of the desired contents of the view.

Build module 516 may cause the generated instructions to be executed. The instructions may be executed by one or more components of the system, including workflow engine 502, storage node 506, validation module 504, and source code repository 514. Execution of the instructions may cause the views and any schema objects on which they depend to be created on the data analysis platform.

In various embodiments, the views and other schema objects may be created in a target schema space. A schema space may refer to a grouping of related objects within storage node 506. Schema objects within the same schema space may refer to and/or depend upon each other. Similar objects—for example different versions of a view—may reside on the same storage node, but in different schema spaces.

In some instances, the build module 516 may form the instructions so that the new versions of the views and other schema objects are initially created in a development schema space 508. Workflow engine 502 may then coordinate various operations—such as those of validation module 504—to move the set of views next to a test schema space 510 and then a production schema space 512. Validation module 504 may conduct or initiate various operations and procedures for determining that the views were successfully created and are functioning as expected. Validation module 504 may cause the set of views to move to the next schema space based on a determination that the validation steps required for advancement to the next stage of the pipeline have been completed.

In some embodiments, schema objects may be copied from one schema space to another. For example, dependency module 518 might determine that a view is not affected by any recent changes to a view definition, and does not require rebuilding due to the addition of new data to a source table. Instead of creating the view from nothing, it might copy the view into a new schema space from the previous schema space. In some cases, the existing object might be moved into the new schema space, for example, by renaming it or reassigning it to a different namespace. Embodiments may then recreate the object in the original schema space. Embodiments may cause an additional view or other schema object to be placed in a target namespace where other views are being recreated. After causing the view to be placed in the target schema space, for example by using a renaming technique as described herein, the embodiment may then cause the additional view to be copied back to its original schema space, where the original versions of the schema objects were located.

FIG. 6 is a block diagram depicting schema spaces applied to a data analysis platform comprising multiple storage nodes. A schema set 608 may refer to a collection of schema spaces 610, 612, and 614. The schema set 608 may not necessarily correspond to a specific structural component of an embodiment, but may nevertheless be useful for the purpose of describe various aspects of possible embodiments.

A data analysis platform 600 may comprise a number of storage nodes, such as storage nodes 602, 604, and 606. The schema set 608, representing schema spaces 610, 612, and 614, may be maintained in each of the storage nodes 602, 604, and 606.

A schema space may refer to a grouping of related objects within storage node. A variety of approaches may be employed regarding schema spaces. In some embodiments, a schema space may correspond to a namespace for schema objects. For example, the full name of a view called "v1," residing in a "development" schema space, might be "development.v1." Queries might be written to explicitly reference the "development.v1" view. Queries might also be written without specifying a namespace, e.g. by referencing "v1." In the latter case, a default namespace might be applied. In other embodiments, naming conventions may be used. For example, a view might be called "development_v1."

A number of the schema spaces 610, 612, and 614 may be active at a time. For example, queries referencing a first schema space 612 might be processed at the same time as other queries referencing a second schema space 614. This may allow a newly deployed schema to be validated prior to being activated, and to allow the previous version to remain in use while the validation is being done. This approach may be used to reduce system downtime.

Queries might be directed to a particular schema space. For example, queries coming from the production version of the system might be directed to use schema objects in schema space 614, which might be considered the production schema space. At some point, however, the queries might instead be directed to another schema space, such as schema space 612. This might occur, for example, when schema space 612 has been validated and is considered ready for use in a production environment. Various approaches may be employed. In FIG. 6, a schema reference 620 may be used to direct queries to a schema space. A schema reference 620 may include the use of naming conventions or namespaces. For example, if schema space 614 was initially associated with the namespace "production," queries directed to the production namespace might be redirected to schema space 612 by changing the namespace of schema space 612 to "production" and changing the namespace of schema space 614 to something else. Embodiments may use these techniques to instruct the database management system to direct queries to views in a different schema space.

In some instances, the views and other schema objects in the namespace might be renamed. For example, a view named "test_v1" might be renamed to "production_v1." Another possible approach is to modify queries that reference a view to reference the production version. For example, a query "select*from dev_v1" might be changed to "select*from prod_v1."

The aforementioned approaches to replacing schema spaces are intended to be illustrative of principles applicable to the present disclosure. These and other approaches may be employed to replace one schema space with another. In general, replacing a schema space involves instructing a database management system, using techniques such as those described, to use one set of views and other schema objects in place of another.

Figure 7:
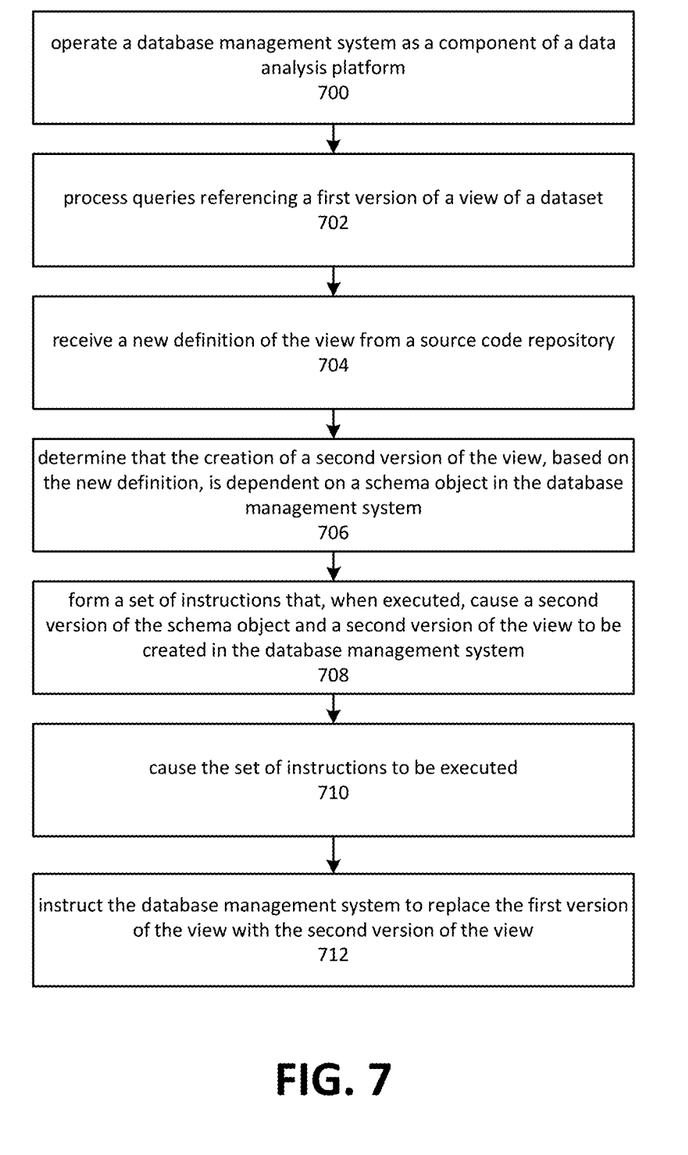
FIG. 7 is a flowchart depicting an example of a deployment pipeline for a view-based data analysis platform.

FIG. 7 is a flowchart depicting an example of a deployment pipeline for a view-based data analysis platform. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 700 depicts operating a database management system as a component of a data analysis platform. As described herein, each storage node of a data analysis platform may comprise a database management system. A database management system on a storage node may maintain views of a dataset as well as various other schema objects. A view may depend upon other schema objects. The dependency may be reflected during creation of the view or subsequently. For example, some views might depend upon certain schema objects that are referenced during materialization, such as stored procedures, user-defined functions, and so forth. In other cases, a view might depend on a schema object for use during query processing. One example of this is a non-materialized view that might depend upon a fact table or a dimension table.

Block 702 depicts the processing of queries that reference a first version of a view. The view may in turn reference a dataset maintained on the database management system, or elsewhere. The term dataset may refer to one or more collections of data on which a view may be based. If the view has been materialized, access to the original dataset may not be needed when the query is processed. An example of a query that references a view is "select*from v1," where "v1" is a view. A database management system, upon processing the query, would return the rows and columns defined in the view.

As depicted by block 704, an embodiment may receive a new definition of the view from a source code repository. The view definition may be included in a file that can be retrieved from the source code repository. In some instances, a set of such files corresponding to a version number may be retrieved and deployed using techniques described herein. A view definition may contain information such its defining query, materialization instructions, and so forth. FIG. 4 gives one example of a view definition.

In various embodiments, a build module may receive an indication from a source code repository that one or more view definitions have changed. In some cases, the indication may be received in response to a request from the build process, which might poll the source code repository on a regular basis to determine if one or more updated view definitions are available and ready to be deployed.

Block 706 depicts an embodiment determining that the creation of a view based on the new definition will depend on another schema object being present in the database management system. A build module, for example, might parse the new definition to identify any schema objects on which the view might depend. This may be performed in conjunction with forming instructions for creating the view, as depicted by block 708. A module, such as a build module, may comprise computer-executable instructions for performing various operations described herein, such as those operations described in FIG. 7.

Embodiments may, as depicted by block 708, form a set of instructions that, when executed, cause a second version of the view to be created in the database management system, based on the new definition of the view. If the view is dependent on other schema objects, the instructions may also cause those objects to be created in an order that is determined to be appropriate. Typically, this involves creating the schema objects on which the view depends prior to the view itself. In some instances, however, a schema object on which a view depends for its operation may be created after the view is created. The instructions for creating the views and other schema objects may typically comprise DDL statements that may be executed by a database management system. The instructions may also comprise workflow-related instructions that can cause the DDL statements to be executed in an appropriate order. The workflow instructions may, in some instances, comprise a script file or batch file that invokes various DDL queries.

Block 710 depicts causing the set of instructions to be executed. The set of instructions may comprise various subsets—such as DDL code—that may be executed by the database management system. Causing the set of instructions to be executed may therefore, in some instances, include transmitting a subset of the instructions to a database management system for execution. The instructions might also include a workflow definition, which may define various stages involved in building and deploying the new version of the view. Examples include instructions for validating that the view was successfully created and determining when or if the new version of the view should replace an existing version.

As depicted by block 712, embodiments may instruct the database management system to replace the first version of the view with the second version of the view. Various example techniques for replacing views are disclosed herein. These include renaming namespaces, changing default namespace, updating references to the view, and so forth. Typically, these steps may be accomplished by setting an appropriate set of DDL commands to the database management system. In some instances, the replacement may involve replacing one schema space with another, so that all of the views and other schema objects in the new schema space are used in place of the objects in the old schema space.

Embodiments of the present disclosure may be employed in conjunction with many types of database management systems. A database management system is a software and hardware system for maintaining an organized or semi-organized collection of data on which storage and retrieval operations may be performed. Examples of database management systems include, but are not limited to, relational databases, key-value databases, document databases, geospatial databases, structured and semi-structured file stores, and so on. In a database management system, data is typically organized by associations between key values and additional data. The nature of the associations may be based on real-world relationships that exist in the collection of data, or it may be arbitrary. Various operations may be performed by a database management system, including data definition, queries, updates, and administration. Some database management systems provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A database management system may comprise various architectural components, such as a storage engine that acts to store data on one or more storage devices—such as solid-state drives. As noted herein, a database management system may be installed on a computing node and operate as a sub-component, or shard, of a distributed database management system.

Figure 8:
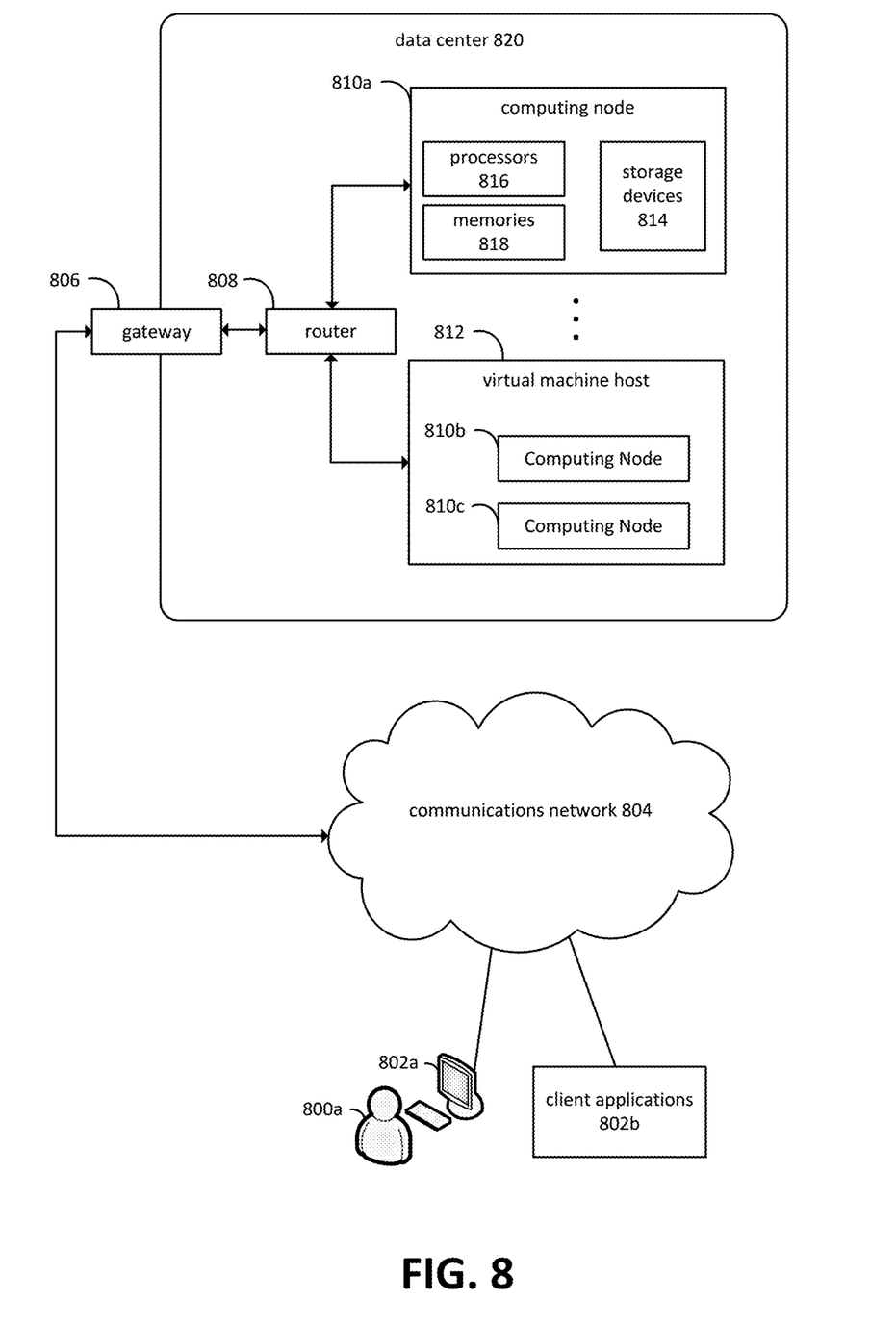
FIG. 8 is a block diagram depicting an embodiment of a computing environment in which aspects of the present disclosure may be practiced.

FIG. 8 is a diagram depicting an example of a distributed computing environment on which aspects of the present invention may be practiced. Various users 800*a* may interact with various client applications, operating on any type of computing device 802*a*, to communicate over communications network 804 with processes executing on various computing nodes 810*a*, 810*b*, and 810*c* within a data center 820. Alternatively, client applications 802*b* may communicate without user intervention. Communications network 804 may comprise any combination of communications technology, including the Internet, wired and wireless local area networks, fiber optic networks, satellite communications, and so forth. Any number of networking protocols may be employed.

Communication with processes executing on the computing nodes 810*a*, 810*b*, and 810*c*, operating within data center 820, may be provided via gateway 806 and router 808. Numerous other network configurations may also be employed. Although not explicitly depicted in FIG. 8, various authentication mechanisms, web service layers, business objects, or other intermediate layers may be provided to mediate communication with the processes executing on computing nodes 810*a*, 810*b*, and 810*c*. Some of these intermediate layers may themselves comprise processes executing on one or more of the computing nodes. Computing nodes 810*a*, 810*b*, and 810*c*, and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing node 810*a* is depicted as residing on physical hardware comprising one or more processors 816, one or more memories 818, and one or more storage devices 814. Processes on computing node 810*a* may execute in conjunction with an operating system or alternatively may execute as a bare-metal process that directly interacts with physical resources, such as processors 816, memories 818, or storage devices 814.

Computing nodes 810*b* and 810*c* are depicted as operating on virtual machine host 812, which may provide shared access to various physical resources, such as physical processors, memory, and storage devices. Any number of virtualization mechanisms might be employed to host the computing nodes.

The various computing nodes depicted in FIG. 8 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 9:
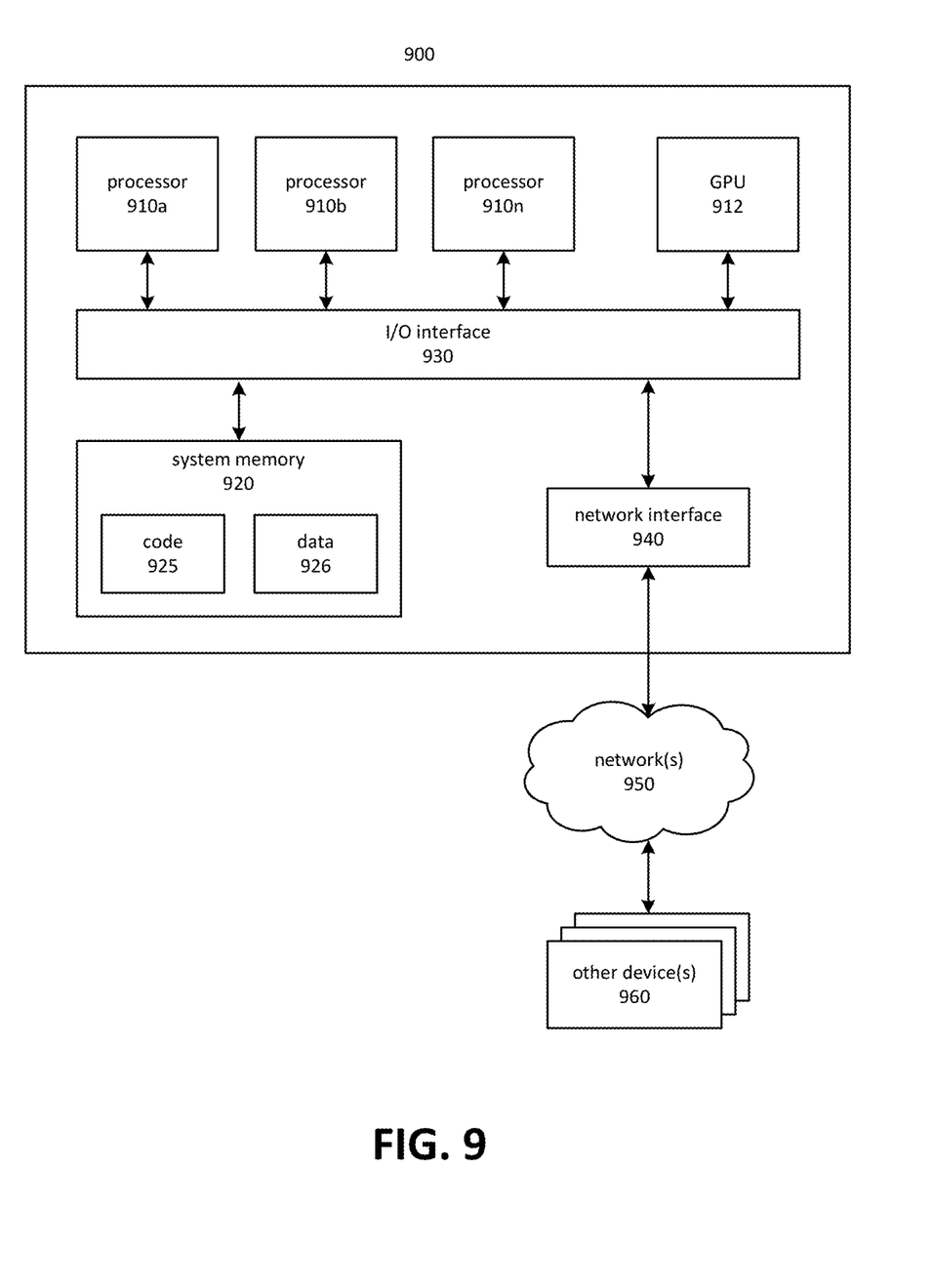
FIG. 9 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 9 depicts a general-purpose computer system that includes or is configured to access one or more computer-accessible media. In the illustrated embodiment, computing device 900 includes one or more processors 910a, 910b, and/or 910n (which may be referred herein singularly as a processor 910 or in the plural as the processors 910) coupled to a system memory 920 via an input/output ("I/O") interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures ("ISAs"), such as the x86, PowerPC, SPARC or MIPS ISAs, or any other suitable ISA. In multiprocessor systems, each of processors 910 may commonly, but not necessarily, implement the same ISA.

In some embodiments, a graphics processing unit ("GPU") 912 may participate in providing graphics rendering and/or physics processing capabilities. A GPU may, for example, comprise a highly parallelized processor architecture specialized for graphical computations. In some embodiments, processors 910 and GPU 912 may be implemented as one or more of the same type of device.

System memory 920 may be configured to store instructions and data accessible by processor(s) 910. In various embodiments, system memory 920 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripherals in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect ("PCI") bus standard or the Universal Serial Bus ("USB") standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or networks 950, such as other computer systems or devices, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 920 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 900 as system memory 920 or another type of memory. Further, a computer-accessible medium may include transmission media or signals, such as electrical, electromagnetic or digital signals, conveyed via a communication medium, such as a network and/or a wireless link, such as those that may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A data analysis system with automated view maintenance, the system comprising:
    one or more computing nodes operating a database management system, the database management system comprising a first version of a database view of a dataset, the database view based at least in part on a first definition, the database view dependent on a first version of a schema object of the database management system; and
    one or more memories having stored thereon computer-readable instructions that, upon execution by a computing device, cause the system at least to:
        receive, from a source code repository, a second definition corresponding to a second version of the database view;
        form a dependency graph based on computerized analysis of the second view definition;
        determine that creation of the second version of the database view is dependent on the schema object;
        form instructions based, at least in part, on the dependency graph that, when executed, cause a second version of the schema object and the second version of the database view to be created on the database management system, the second version of the database view based at least in part on the second definition;
        cause the instructions to be executed;
        instruct the database management system to replace the first version of the database view with the second version of the database view and to replace the first version of the schema object with the second version of the schema object, wherein instructing the database management system to replace the first version of the database view with the second version of the database view comprises updating a query containing a reference to the first version of the database view to refer to the second version of the database view; and
        cause the second version of the database view to be used in place of the first version of the database view in response to validating that the second version of the database view was successfully created.

2. The system of claim 1, further comprising one or more memories having stored thereon computer-readable instructions that, upon execution by the computing device, cause the system at least to:
    cause the second version of the database view to be recreated based at least in part on determining that the second version of the database view is most recent and on determining that a threshold amount of time has elapsed since the second version of the database view was last created.

3. The system of claim 1, further comprising one or more memories having stored thereon computer-readable instructions that, upon execution by the computing device, cause the system at least to:
    recreate current versions of a plurality of database views of the database management system on a periodic basis determined based at least in part on a frequency at which data is added to the database management system.

4. The system of claim 1, wherein the schema object is a stored procedure, a user-defined function, a fact table, or a dimension table.

5. The system of claim 1, wherein the first version of the database view is a first structured query language (SQL) view and the second version of the database view is a second SQL view.

6. A method of automating view maintenance in a data analysis system, the method comprising:
    processing queries of the data analysis system using a first version of a database view of a dataset maintained by a database management system, the database view based at least in part on a first definition, the database view dependent on a first version of a schema object of the database management system;
    receiving a second definition corresponding to a second version of the database view;
    forming a dependency graph based on computerized analysis of the second definition;
    determining that creating the second version of the database view based on the second definition is dependent on the schema object of the database management system;
    executing instructions based, at least in part, on the dependency graph that cause a second version of the schema object and the second version of the database view to be created on the database management system, the second version of the database view based at least in part on the second definition; and instructing the database to process a command causing the second version of the database view to replace the first version of the database view based at least in part on validating that the second version of the database view was successfully created, wherein instructing the database to process the command includes updating a query containing a reference to the first version of the database view to refer to the second version of the database view.

7. The method of claim 6, further comprising:

deactivating the first version of the database view in response to processing information indicating that the second version of the database view was successfully installed.

8. The method of claim 6, further comprising:

recreating the second version of the database view in response to determining that the second version of the database view is most recent and that a threshold amount of time has elapsed since the second version of the database view was last created.

9. The method of claim 6, wherein instructing the database to process queries using the second version of the database view in place of the first version of the database view comprises updating a reference to the first version of the database view.

10. The method of claim 6, further comprising:

creating the second version of the database view in a second schema space, wherein the first version of the database view is in a first schema space.

11. The method of claim 10, wherein instructing the database to process queries using the second version of the database view in place of the first version of the database view comprises renaming the second schema space to a name of the first schema space.

12. The method of claim 6, further comprising:

recreating current versions of a plurality of database views of the database management system on a periodic basis determined based at least in part on a frequency at which view definitions are added to a source code repository.

13. The method of claim 6, wherein data in the database management system is obtained from one or more additional database management systems.

14. The method of claim 6, wherein the instructions comprise data definition language statements.

15. A non-transitory computer-readable storage medium having stored thereon instructions that, upon execution by one or more computing devices, cause the one or more computing devices at least to:

receive a second definition of a second version of a database view of a dataset, wherein a first version of the database view is maintained by a database management system, the database view based at least in part on a first definition, the database view dependent on a first version of a schema object of the database management system;

determine that the second version of the database view is dependent on the schema object of the database management system;

form a dependency graph based on computerized analysis of the second definition;

form instructions based, at least in part, on the dependency graph that, when executed, cause a second version of the schema object and the second version of the database view to be created on the database management system, the second version of the database view based at least in part on the second definition;

cause the instructions to be executed;

validate that the second version of the database view was successfully created; and cause the first version of the object to be replaced, in the schema of the database management system, by the second version of the object and cause the first version of the database view to be replaced by the second version of the database view based, at least in part, in response to the validation that the second version of the database view was successfully created, wherein causing the first version of the database view to be replaced by the second version of the database view comprises updating a query containing a reference to the first version of the database view to refer to the second version of the database view.

16. The non-transitory computer-readable storage medium of claim 15, comprising further instructions that, upon execution by the one or more computing devices, cause the one or more computing devices to at least:

cause an additional database view to be placed in a second schema space containing the second version of the database view; and cause the additional database view to be copied to a first schema space containing the first version of the database view.

17. The non-transitory computer-readable storage medium of claim 15, comprising further instructions that, upon execution by the one or more computing devices, cause the one or more computing devices to at least:

cause the first version of the database view to be replaced with the second version of the database view by at least renaming a second schema space associated with the second version of the database view to a name of a first schema space associated with the first version of the database view.

18. The non-transitory computer-readable storage medium of claim 15, comprising further instructions that, upon execution by the one or more computing devices, cause the one or more computing devices to at least:

rematerialize a database view of the database management system on a periodic basis determined based at least in part on a frequency at which data is added to the database management system.

19. The non-transitory computer-readable storage medium of claim 18, wherein rematerializing the database view comprises obtaining data from one or more additional database management systems.

20. The non-transitory computer-readable storage medium of claim 15, wherein the schema object is a stored procedure, a user-defined function, a fact table, or a dimension table.

* * * * *